July 21, 1970 D. R. WEHNER 3,521,199

TUNABLE BANDSTOP MICROWAVE SWITCH COMPRISING A PIN DIODE AND VARIABLE CAPACITANCE

Filed Feb. 18, 1969 2 Sheets-Sheet 1

INVENTOR.
DONALD R. WEHNER
BY [signature] [signature]
ATTORNEYS

INVENTOR.
DONALD R. WEHNER
BY
ATTORNEYS

United States Patent Office 3,521,199
Patented July 21, 1970

3,521,199

TUNABLE BANDSTOP MICROWAVE SWITCH COMPRISING A PIN DIODE AND VARIABLE CAPACITANCE

Donald R. Wehner, San Diego, Calif., assignor to the United States of America as represented by the Secretary of the Navy Filed Feb. 18, 1969, Ser. No. 800,210
Int. Cl. H01p *1/10, 1/20;* H03b *7/10*
U.S. Cl. 333—73 6 Claims

ABSTRACT OF THE DISCLOSURE

At least one PIN diode is connected to the central conductor of a coaxial line which is capable of transmitting microwave energy. A variable capacitor is connected in series between each of such diodes and the outside conductor of the coaxial lines. Additionally, a means is provided externally to the coaxial line for the series circuit including the each PIN diode and each variable capacitor to resonate at a bandwidth of frequencies which it is desired to substantially entirely attenuate.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the prior art, microwave switches frequently were either fixed, tuned single element, narrow band devices or broadband multielement devices employing microwave filter design techniques such that signals were passed in the "on" mode and highly attenuated over a wide band of frequencies in the "off" mode. The prior art single element, fixed tuned devices were often difficult to precisely design for the frequency which it was desired to switch off or attenuate, and moreover were bandwidth limited. On the other hand, multielement broadband devices require numerous elements and considerable complex design to provide even moderate amounts of isolation.

SUMMARY OF THE INVENTION

The present invention comprises a tunable bandstop switch for operation in the microwave frequency region which is particularly advantageous for use with coaxial transmission lines. It comprises one or more PIN diodes connected to the central conductor of the coaxial transmission line and a variable capacitance element connected in series between each such diode and the outside conductor of the coaxial transmission line. Means external to the coaxial transmission line is provided for tuning the series circuit including each diode and each variable capacitance to resonate at a bandwidth of frequencies which it is desired to attenuate. The novel arrangement and circuitry may preferably be mounted transverse to the coaxial transmission line so as to house and support each series combination of a PIN diode and a variable capacitance element therein. This tunable switch affords convenient connection to appropriate switch driver circuitry which causes conduction in a diode or alternately provides bias so that it is substantially nonconductive. A multiplicity of such transversely mounted tunable switches may be provided, each being tunable to different center frequencies. In some instances, it may be highly desirable to have each bandwidth of frequencies slightly overlap a contiguous bandwidth of frequencies to provide a board bandwidth of attenuated frequenciees.

Thus, three or more tunable bandstop switches may be provided to afford an extremely efficient and precise, broad bandstop characteristic. The transverse mounting in the preferred embodiment of the present invention affords a highly desirable and easily accessible final adjustment of isolation vs. frequency characteristics. Moreover, if a different bandwidth or bandwidths of frequencies is desired to be attenuated, the operative characteristics of the tunable bandstop switches may be readily changed and altered by tuning the variable capacitance to effect the desired results.

Accordingly, it is a primary object of the present invention to provide an improved tunable bandstop switch which is particularly adapted for use with coaxial transmission lines.

Another most important object of the present invention is to provide a tunable bandstop switch which is so mounted relative to a coaxial transmission line as to be readily adjustable by external means for prefecting its performance or changing operative characteristics as needs may dictate.

Yet another most important object of the present invention is to provide a tunable bandstop switch which may be embodied in a plurality of separately tunable subassemblies permitting precise tuning for discrete bandstop characteristics or broad bandstop characteristics as desired.

A further object of the present invention is to provide a tunable bandstop switch for use in the microwave region which affords easily accessible tunability, precise adjustment of bandstop characteristics, and a high degree of isolation from the bias circuitry of its associated switch driver.

These and other objects, advantages, and features of the present invention will be better understood from the description of several embodiments of the present invention which follows when taken together with the accompanying drawings.

DESCRIPTION OF THE PREFERRED EMBODIMENT

Figure 1:
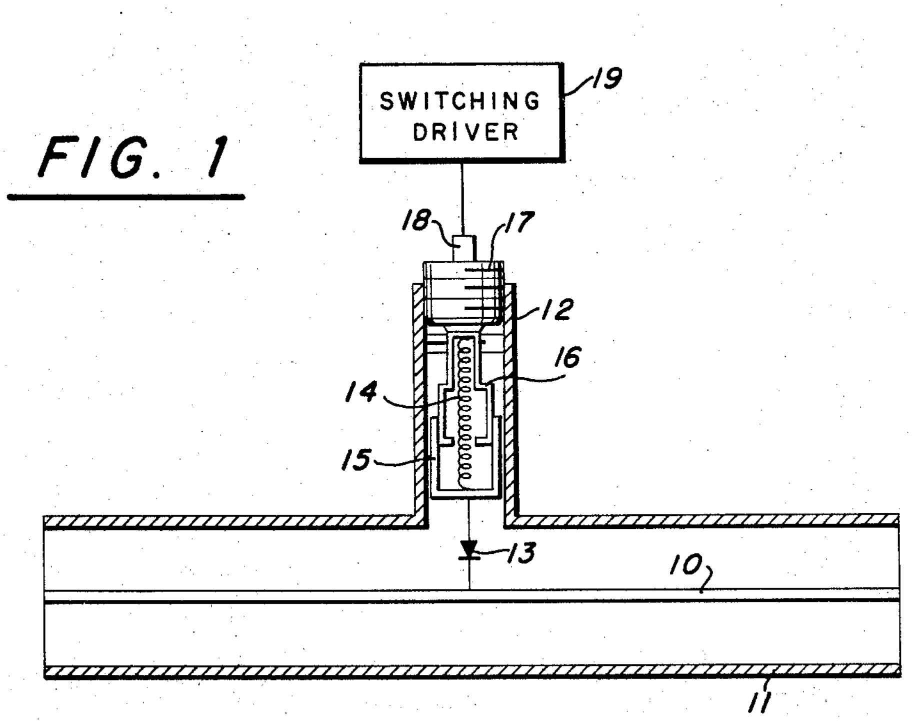
FIG. 1 is a partially schematic representation of an embodiment of the present invention.

FIG. 1 schematically represents an embodiment of the present invention employed with a coaxial line comprising a central conductor 10 and an external conductor 11. Transversely mounted relative to the coaxial line is a housing 12 which support an assembly consisting of a PIN diode 13 connected to the central conductor 10 of the coaxial line and in series electrical connection with a variable capacitance. The variable capacitance comprises a stationary member 15 generally shown as a cup-like configuration, and a movable member 16 resiliently held apart by a spring 14 which is connected to a threaded member 17 supported in the housing 12. The movable capacitance member 16 is arranged to be adjustable in an up and down fashion responsive to the position of the threaded member 17 which can be screwed in or out of the housing member 12. Accordingly, the movable portion 16 of the variable capacitance 15 and 16 may be selectively displaced and positioned so as to vary the capacitive value developed by the inner elements 15 and 16 together with the housing 12. The threaded member 17 has an electrical connection 18 extended therefrom which is connected to a switching driver circuit 19, preferably through a quarter wavelength section of line which will be explained more fully hereinafter.

Figure 2:
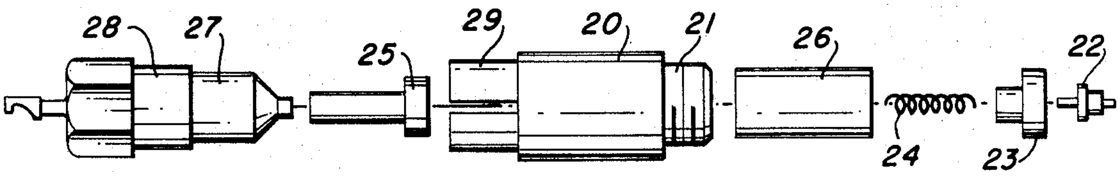
FIG. 2 is an exploded view of one form of tunable bandstop switch which may be employed with and supported upon a coaxial transmission line section.

FIG. 2 illustrates in an exploded view the physical elements which are preferably connected to a coaxial line in a transverse position, as illustrated in FIG. 1. In FIG. 2 a supporting member 20 includes a threaded portion 21 to facilitate mechanical and electrical connection to the external conductor of the coaxial line. A PIN diode 22 of an appropriate type is electrically connected to the central conductor of the coaxial line and also connects electrically in series with the stationary portion 23 of a variable capacitance member. A spring member 24 is positioned between the stationary member 23 of the variable capacitance and the movable member 25 of the variable capacitance. The assembly comprising the stationary member 23 of the variable capacitance, the spring 24, and the movable member 25 of the capacitance, are all positioned within an insulating member 26 fitted so as to electrically isolate the inner variable capacitance elements from the capacitance element comprising the conductive walls of the supporting portion 20.

The stationary member 23 of the variable capacitance elements may be in the form of a cup-like member, while the movable portion 25 of the variable capacitance elements may be of the plunger-type configuration having a hollow, tubular stem adapted to receive the spring member 24 so that it is positioned between a stub on a conductive member 27 having a threaded portion 28 which screws into an internally threaded portion 29 of the supporting member 20. Thus, by turning the member 27, the movable portion 25 of the variable capacitance is displaced closer to or further away from the stationary member 23 resulting in a variable capacitance to the housing 20 thereby varying the capacitive value which is connected electrically in series with the diode 22.

Figure 3:
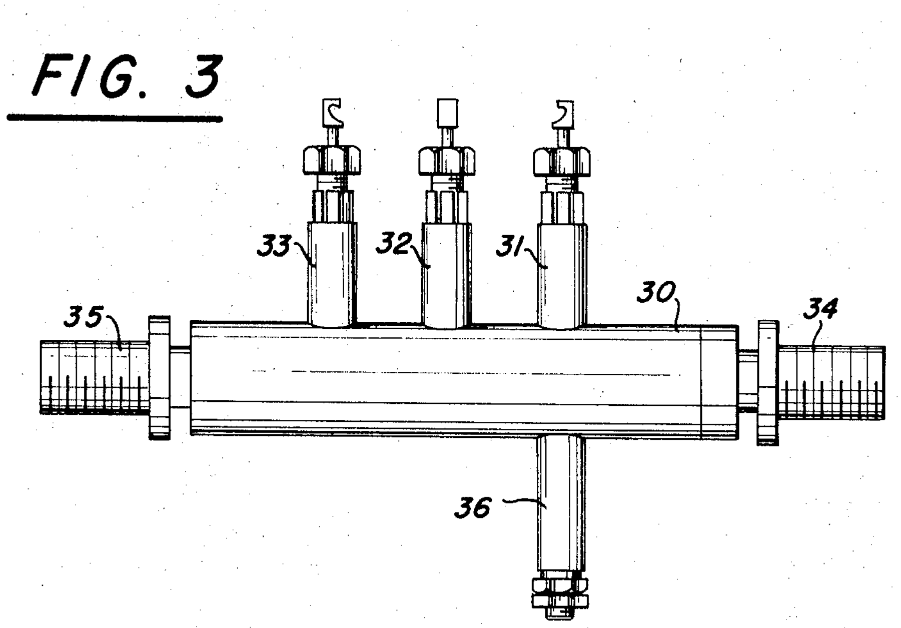
FIG. 3 is a side view of an embodiment of the present invention including multiple, tunable bandstop switches.
Figure 4:
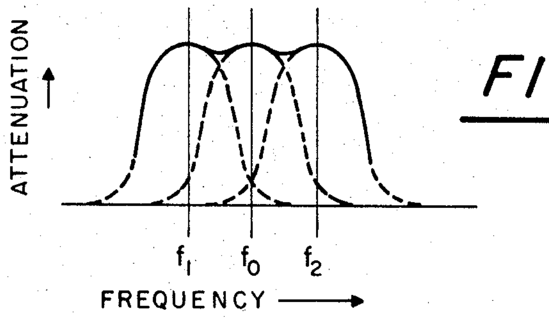
FIG. 4 is a graphic illustration of the typical response of multiple, tunable bandstop switches during forward conduction of the diodes to provide broad bandstop characteristics.

FIG. 3 is a side view of an embodiment of the present invention wherein three bandstop switching assemblies, each generally of the type shown in the exploded view in FIG. 2, are arranged and supported on a small section of coaxial transmission line. The external portion 30 of the section of the coaxial transmission line supports the bandstop switch assemblies 31, 32, and 33. For convenience of connection, the section 30 of the coaxial transmission line is fitted with threaded end members 34 and 35 for electrical and mechanical connection to an appropriate coaxial transmission line. Also supported on the section of coaxial transmission line 30 is a quarter wavelength stub 36 for bias grounding. The three bandstop switch assemblies 31, 32, and 33 are tunable to separate frequencies so as to provide a broadband attenuation as may be desired. Thus, the bandstop switch assembly 31 may be tuned to a frequency $f_0$ while bandstop switch assembly 32 is tuned by variation of a variable capacitance in series with a PIN diode connected to the central coaxial conductor to another frequency $f_1$, while the bandstop switch assembly 33 is tuned to yet another frequency $f_2$. These frequencies may be related as illustrated in FIG. 4 so as to provide a broadband attenuation as indicated by the solid outline embracing the three attenuation characteristics of the frequencies $f_0$, $f_1$ and $f_2$ which overlap as shown generally by the dash line configuration of attenuation characteristics.

Bandstop switches 31, 32, and 33 are, of course, driven by appropriate switching driver circuitry to which each may be connected by an appropriate bias connection which isolates the bias circuitry from the microwave portion of the entire assembly. Such driving circuitry may typically consist of a transistor switch driver capable of biasing the PIN diode for nonconduction when desired, and when actuated in a second condition to cause forward conduction of the diode when desired. Also included in the assembly in FIG. 3 is a one-quarter wavelength stub for connecting the central conductor of the coaxial line to the external conductor or ground through an appropriate impedance. The one-quarter wavelength, in the case of the three switch assemblies, would be related to the frequency $f_0$ as illustrated in FIG. 4. In the case of a single bandstop switch, the quarter wave-length stub would, of course, be related to the median frequency of the bandwidth which it is desired to attenuate.

Figure 5:
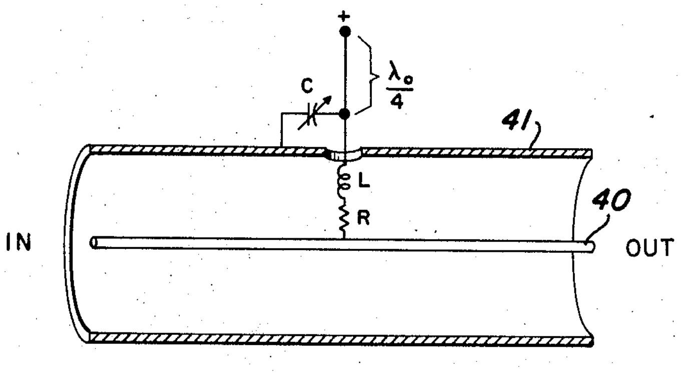
FIG. 5 is a representation of an equivalent circuit illustrating the electrical elements included in one section of the tunable bandstop switch of the present invention for the "off" or forward conduction condition.

FIG. 5 shows an equivalent electrical circuit to illustrate the relationships of the various electrical values involved in the combination of the present invention when connected with and employed on a coaxial line to cause substantial attenuation of signals over selected bandstop frequencies. A section of coaxial transmission line is shown in cross-section, the inner conductor 40 being coaxially positioned relative to a cylindrical external conductor 41. As shown in FIG. 1, a diode is connected electrically to the central conductor 40.

A typical appropriate diode may be represented electrically as comprising an ohmic resistance R whose value is much less than the coaxial line characteristic impedance and an inductance represented schematically and designated L. The ohmic resistance R and inductance L of the diode are effectively connected to ground of the external conductor 41 through a variable capacitance C. Connected in series between the diode (as represented by the inductance L and the ohmic resistance R) and the switching driver (as represented by a positive electrical potential +) is a quarter wavelength section of line which is employed to isolate the bias circuitry from the microwave portion of the assembly. Thus, it may be seen that the variable capacitance is employed to tune the bandstop switch of the present invention to a resonant condition as between variable capacitance C and the fixed inductance L of the diode so that at a selectable, tuned frequency, about which it is desired to attenuate signals, the bandstop switch assembly will appear electrically as a purely ohmic resistance. Accordingly, at the selected frequency, bandstop switching is effected by a bandwidth of frequencies being effectively reflected down the coaxial line for a substantial attenuation. This is caused by forward conduction through the diode under the control of the switching driver which results in the inductance L and variable capacitance C resonating at the selected median frequency.

Accordingly, it will be seen that the present invention conceives a readily tunable bandstop switching arrangement which can be employed in multiple units to provide a relatively broadband attenuation as illustrated in FIG. 4 and is also tunable to readily accommodate the requirement for bandstop switching at different frequencies as may be required from time to time. It has been found that an appropriate PIN diode for use in bandstop switching over the frequency range of 2 gHz. to 4 gHz. in a Microwave Associates MA4571C. However, it should be understood that within the spirit, concept, and teaching of the present invention any microwave semiconductor device of appropriate characteristics and capabilities may be employed substantially in the manner illustrated and described in the preferred embodiment disclosed herein.

What is claimed is:

1. A PIN diode tunable bandstop switch for a coaxial line comprising:

at least one PIN diode connected to the central conductor of said coaxial line;

a variable capacitance connected in series between each said diode and the outside conductor of said coaxial line;

means external to said coaxial line for tuning the series circuit including each said diode and each said variable capacitance to resonate at a bandwidth of frequencies it is desired to attenuate; and a switching driver for biasing said diode to nonconduction or causing forward conduction by said diode as desired.

2. A bandstop switch as claimed in claim 1 wherein each said diode and variable capacitance is mounted and supported within a hollow conductor affixed in orthogonal relationship to said coaxial line and communicating with the interior thereof.

3. A bandstop switch as claimed in claim 2 wherein said variable capacitance comprises a stationary member supported within said hollow conductor and a movable member resiliently supported for selective disposition along the principal axis of said hollow conductor.

4. A bandstop switch as claimed in claim 1 and including a plurality of PIN diodes, each connected in series between the central conductor of said coaxial line and an associated variable capacitance connected to the outside conductor of said coaxial line.

5. A bandstop switch as claimed in claim 4 and including a plurality of variable capacitances, each connected in series with a PIN diode to form a circuit between said central conductor and said exterior conductor, each said circuit being tunable to attenuate a determinable bandwidth of frequencies.

6. A bandstop switch as claimed in claim 5 wherein each said circuit is tunable to attenuate a determinable bandwidth of frequencies contiguous to at least one of the other attenuated determinable bandwidth of frequencies.

References Cited

UNITED STATES PATENTS

| | | | |
|---|---|---|---|
| 2,959,778 | 11/1960 | Bradley | 333—7 X |
| 3,290,624 | 12/1966 | Hines | 333—31 |
| 3,453,564 | 7/1969 | Russell | 333—17 X |

PAUL L. GENSLER, Primary Examiner

U.S. Cl. X.R.

317—249; 333—97